US010176721B2

(12) United States Patent
Malviya et al.

(10) Patent No.: US 10,176,721 B2
(45) Date of Patent: Jan. 8, 2019

(54) SYSTEM AND METHOD TO DEPICT GEODETIC REFERENCE DATUM NON-COMPLIANCE REGIONS, AIRPORTS, AND FLIGHT PLANNING ELEMENTS ON AVIONICS BASED DISPLAYS

(71) Applicant: HONEYWELL INTERNATIONAL INC., Morris Plains, NJ (US)

(72) Inventors: Pramod Kumar Malviya, Karnataka (IN); Pradeep Huncha, Karnataka (IN); Vinay Somashekar, Karnataka (IN); Sreenivasan Govindillam K, Karnataka (IN); Nathan K, Karnataka (IN); Anoop S, Karnataka (IN); Sunitha Panchangam, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 212 days.

(21) Appl. No.: 15/370,029

(22) Filed: Dec. 6, 2016

(65) Prior Publication Data
US 2018/0158343 A1 Jun. 7, 2018

(51) Int. Cl.
*G08G 5/00* (2006.01)
*B64D 45/08* (2006.01)
(Continued)

(52) U.S. Cl.
CPC .......... *G08G 5/0034* (2013.01); *B64D 43/00* (2013.01); *B64D 45/08* (2013.01); *G01C 21/00* (2013.01);
(Continued)

(58) Field of Classification Search
CPC .... G08G 5/0034; G08G 5/0052; B64D 45/08; B64D 43/00; G01C 23/005; G01C 21/20; G01C 21/00
(Continued)

(56) References Cited

U.S. PATENT DOCUMENTS 5,216,611 A * 6/1993 McElreath ........... G01C 21/165
342/357.32
5,361,212 A * 11/1994 Class .................... G01S 5/0009
244/114 R
(Continued)

FOREIGN PATENT DOCUMENTS

CN 103201594 A 7/2013

OTHER PUBLICATIONS

Extended EP Search Report for Application No. 17204234.3 dated Apr. 6, 2018.
(Continued)

*Primary Examiner* — Jaime Figueroa
(74) *Attorney, Agent, or Firm* — Lorenz & Kopf, LLP

(57) ABSTRACT

Systems and methods are provided for displaying portions of a route on a coverage map that are non-compliant for a Global Navigation Satellite System (GNSS) navigation system in an aircraft. A route compliance module defines a geodetic reference datum standard based on the GNSS navigation system. A navigation system database has compliance information corresponding to each of a plurality of airports. A flight management system determines the route of the aircraft and a visual display displays the route and the coverage map. The route compliance module identifies a non-compliant region of the coverage map that is not compliant with the geodetic reference datum standard based on the compliance information and adjusts the visual display to differentiate a non-compliant portion of the route extending within the non-compliant region of the coverage map.

20 Claims, 3 Drawing Sheets

(51) Int. Cl.
  *G01C 23/00* (2006.01)
  *G01C 21/20* (2006.01)
  *G01C 21/00* (2006.01)
  *B64D 43/00* (2006.01)

(52) U.S. Cl.
  CPC ........... *G01C 21/20* (2013.01); *G01C 23/005* (2013.01); *G08G 5/0052* (2013.01)

(58) Field of Classification Search
  USPC ..................................................... 701/1, 428
  See application file for complete search history.

(56) References Cited

U.S. PATENT DOCUMENTS

| | | | | |
|---|---|---|---|---|
| 6,195,609 B1* | 2/2001 | Pilley | ............... | G01C 23/00 342/36 |
| 6,675,095 B1* | 1/2004 | Bird | ............... | G05D 1/0061 340/436 |
| 7,650,232 B1* | 1/2010 | Paielli | ............... | G01C 23/005 340/963 |
| 7,693,621 B1* | 4/2010 | Chamas | ............... | G08G 5/0021 340/951 |
| 8,094,154 B1* | 1/2012 | Silberg | ............... | G01C 23/00 345/440 |
| 8,165,087 B2 | 4/2012 | Panabaker | | |
| 8,234,058 B1* | 7/2012 | Barber | ............... | G01C 23/00 701/120 |
| 8,718,915 B1* | 5/2014 | Turcios | ............... | G01C 23/005 342/176 |
| 9,193,442 B1* | 11/2015 | Young | ............... | B64C 19/00 |
| 9,818,305 B2* | 11/2017 | Conway | ............... | G08G 5/02 |
| 2002/0069019 A1* | 6/2002 | Lin | ............... | G05D 1/0055 701/301 |
| 2003/0020120 A1 | 1/2003 | Ye et al. | | |
| 2003/0206120 A1* | 11/2003 | Ishihara | ............... | G01O 5/005 340/970 |
| 2005/0182530 A1* | 8/2005 | Murphy | ............... | G01C 23/00 701/16 |
| 2013/0300587 A1* | 11/2013 | Wyatt | ............... | G01C 23/00 340/972 |
| 2014/0240148 A1* | 8/2014 | Krishnamurthy | ............... | G01C 21/32 340/971 |
| 2014/0303815 A1* | 10/2014 | Lafon | ............... | G01C 21/3446 701/3 |
| 2015/0081143 A1* | 3/2015 | Snow | ............... | G08G 5/0021 701/16 |
| 2016/0086497 A1* | 3/2016 | Williams | ............... | G06K 9/0063 701/16 |
| 2016/0171899 A1* | 6/2016 | Depare | ............... | G08G 5/065 701/120 |
| 2017/0046962 A1* | 2/2017 | Shipley | ............... | G08G 5/0091 |

OTHER PUBLICATIONS

Holt, Jeff, "Use of GPS in non WGS-84," Mar. 24, 2016, XP055462603, International Operators Conference, San Diego, CA.
Zinoviev, Alexei, "Using GLONASS in Combined GNSS Receivers: Current Status," GNSS 2005—Proceedings of the 18th International Technical Meeting of the Satellite Division of the Institute of Navigation, Sep. 16, 2005, pp. 1046-1057.

* cited by examiner

SYSTEM AND METHOD TO DEPICT GEODETIC REFERENCE DATUM NON-COMPLIANCE REGIONS, AIRPORTS, AND FLIGHT PLANNING ELEMENTS ON AVIONICS BASED DISPLAYS

TECHNICAL FIELD

The exemplary embodiments described herein generally relate to displaying aircraft navigation information and more particularly to displaying regions on a coverage map that are non-compliant for an Global Navigation Satellite System (GNSS) navigation system in an aircraft.

BACKGROUND

Global Navigation Satellite System (GNSS) based navigation is widely used in precision navigation and performance based navigation systems in vehicles, particularly aircraft. The GNSS receiver resolves the vehicle or aircraft position based on the position reference system (Geodetic Datum), that is generally interchangeable with service providers like European Geostationary Navigation Overlay Service (EGNOS), Global Navigation Satellite System (GLONASS), Wide Area Augmentation System (WAAS), et cetera. The most commonly used position reference is World Geodetic System (WGS-84) which is an Earth-centered, Earth-fixed terrestrial reference system and geodetic datum. Global Positioning Systems (GPS) use WGS-84 whereas GLONASS use Parametry Zemli 1990 (PZ-90). WGS-84 and PZ90 are interoperable.

The navigation database used with aircraft navigation systems like flight management systems (FMS) detail waypoints and their positions. These positions are either surveyed per WGS-84 or based on a nonstandard local reference, and the compliance information is available in the navigation database. Since GPS uses WGS-84, when operating in countries that do not use WGS-84 (e.g., Russia, China), pilots should exercise caution because the surveyed latitude & longitude of the airport and other navigation database references are not consistent with positions provided by the WGS-84 based GPS. The use of local radio aides stored in the navigation database will be consistent with the surveyed locations. Continuing with a GPS based navigation in geographical areas like this would lead to inaccurate GPS data.

It is critically important that an aircraft has accurate GPS data in order to make precision approaches during landing. The pilot should not engage GPS approaches to non-compliant airports since the databases in the aircraft are in WS-84 format. Currently, there is no mechanism to differentiate the WGS-84 airports from the non-compliant airports on the Multi-Function Display (MFD) of the aircraft. Lack of this differentiation or indication may lead to issues during landing such as deviations from the intended or desired approach path. On most aircraft, the pilot can manually deselect the GPS prior to the approach, if the compliance to WGS-84 is not known. It is recommended pilots do so prior to the approach so the system has time to acquire ground-based navigation and triangulate position in time for the arrival procedure. Procedures vary somewhat based on the avionics system and FMS software version.

Accordingly, it is desirable to provide a system and method for displaying portions of a route on a coverage map that are non-compliant for an GNSS navigation system in an aircraft. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

In an exemplary embodiment, a system for displaying portions of a route on a coverage map that are non-compliant for a GNSS navigation system in an aircraft includes a route compliance module that is configured to define a geodetic reference datum standard based on the GNSS navigation system. The system further includes a navigation system database that has compliance information corresponding to each of a plurality of airports. The system further includes a flight management system that is configured to determine the route of the aircraft and a visual display that is configured to display the route and the coverage map. The route compliance module is further configured to query the navigation system database to identify a non-compliant region of the coverage map that is not compliant with the geodetic reference datum standard based on the compliance information, and adjust the visual display to differentiate a non-compliant portion of the route extending within the non-compliant region of the coverage map.

In an exemplary embodiment, a system for displaying regions on a coverage map that are non-compliant for a GNSS navigation system in an aircraft includes a route compliance module that is configured to define a geodetic reference datum standard based on the GNSS navigation system. The system further includes a navigation system database having compliance information corresponding to each of a plurality of airports. The system further includes a flight management system configured to determine the route of the aircraft and a visual display configured to display the route and the coverage map. The route compliance module is further configured to query the navigation system database to identify a non-compliant region of the coverage map that is not compliant with the geodetic reference datum standard based on the compliance information and the route, and adjust the visual display to differentiate the non-compliant region on the coverage map.

In an exemplary embodiment, a method for displaying portions of a route on a coverage map that are non-compliant for a GNSS navigation system in an aircraft includes defining a geodetic reference datum standard based on the GNSS navigation system. The coverage map is displayed on a visual display. A navigation system database is queried to identify a compliant region of the coverage map that is compliant with the geodetic reference datum standard. The navigation system database is queried to identify a non-compliant region of the coverage map that is not compliant with the geodetic reference datum standard. A flight management system is queried for a route of the aircraft and displays the route on the coverage map. The visual display is adjusted to differentiate a compliant portion of the route and a non-compliant portion of the route.

BRIEF DESCRIPTION OF THE DRAWINGS

The present invention will hereinafter be described in conjunction with the following drawing figures, wherein like numerals denote like elements.

DETAILED DESCRIPTION

Figure 1:
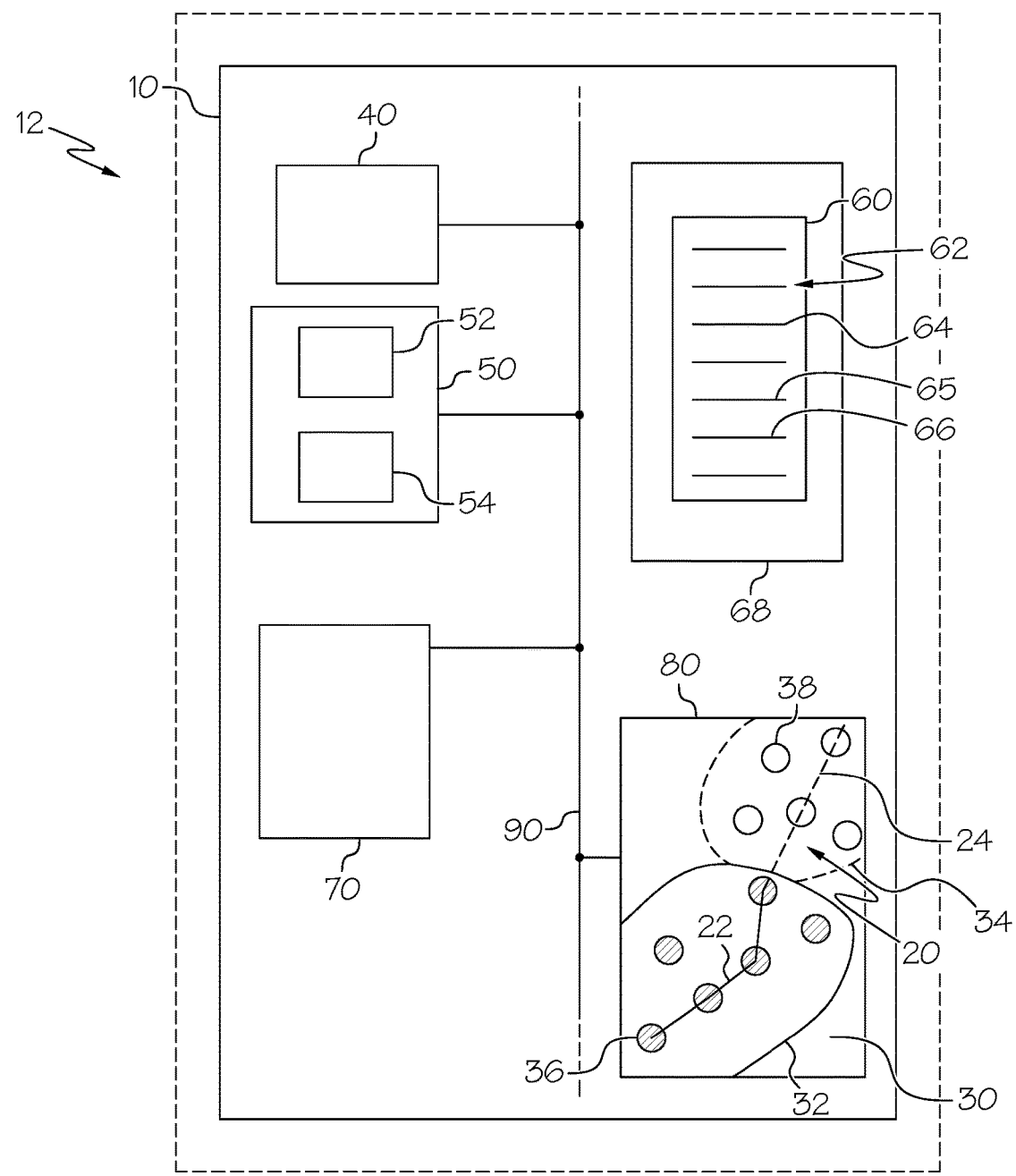
FIG. 1 is a block diagram of an exemplary system for displaying portions of a route on a coverage map that are non-compliant for a GNSS navigation system in an aircraft.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments. Any of the above devices are exemplary, non-limiting examples of a computer readable storage medium.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Any of the above devices are exemplary, non-limiting examples of a computer readable storage medium In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

With reference now to FIG. 1, a system 10 for displaying portions of a route 20 on a coverage map 30 that are non-compliant for a GNSS navigation system 40 in an aircraft 12 is shown herein. The system 10 is generally implemented in the aircraft 12, however, in a non-limiting embodiment, the system 10 is implemented in other vehicles including automobiles, helicopters, and the like. The system 10 includes a route compliance module 50, a navigation system database 60, a flight management system or FMS 70, and a visual display 80. The components of the system are generally in electronic communication with a communications bus 90.

The coverage map 30 generally refers to a top-down map that shows an area surrounding the aircraft 12, the route 20, airports, or other features relevant to aircraft navigation. Additional information may be displayed on the coverage map 30, however, in a non-limiting embodiment of the system 10, the display 80 displays the coverage map 30 and the route 20. Further features of the coverage map 30 will be discussed below.

The route compliance module 50 generally includes a processor 52 and a memory 54 to allow the compliance module 50 to process information. The route compliance module 50 is in communication with the communications bus 90 and is configured to define a geodetic reference datum standard based on the GNSS navigation system 40. As detailed above, the GNSS navigation system 40 precisely locates the aircraft 12 and. The GNSS navigation system 40 uses a geodetic reference datum and in a non-limiting embodiment the geodetic reference datum is World Geodetic System (WGS-84), however other GNSS navigation systems 40 and corresponding geodetic reference data may be used without departing from the spirit of the disclosed subject matter. The route compliance module 50 is configured to define a geodetic reference datum standard based on the geodetic reference datum used by the GNSS navigation system 40. In a non-limiting embodiment, the GNSS navigation system 40 is an approach landing system.

The navigation system database 60 has compliance information 62 corresponding to a plurality of airports 64, 65, 66. The navigation system database is generally a part of a navigation system 68 that is in communication with the communications bus 90. The operation of the navigation system 68 beyond the navigation system database 60, while contemplated, is not further described herein.

The each airport 64, 65, 66, stored in the navigation system database 60 has corresponding compliance information 62 that identifies whether the airport is compliant with the geodetic reference datum standard or whether the airport is not compliant with the geodetic reference datum standard. While only a limited number of airport compliance information 62 is shown in the navigation system database 60 for simplicity, one skilled in the art will understand that any number of airports and additional airport information may be stored in the navigation system database 60. The navigation system database 60 may also be regularly updated to ensure that the compliance information 62 is current and accurate.

The communications bus 90 allows the route compliance module 50 to communicate with other systems and components connected to the communications bus 90. In an example, the communications bus 90 is a CAN network, however one skilled in the art will appreciate that various communication networks such as FlexRay, A2B, Switched Ethernet, or other known communication networks may be implemented as the communications bus 90. Thus, the present disclosure is not limited to any specific type of communication bus 90 or protocol. Furthermore, while the components of the system 10 are depicted in communication through a direct connection for simplicity, one skilled in the art will appreciate that the system 10 may be implemented over the communications bus 90 in various arrangements and electrical connections. For example, the communications bus 90 may include wireless connections (not shown) along with direct wired connections.

The Flight Management System or FMS 70 is also in communication with the communications bus 90. The FMS 70 on modern aircraft handle any number of aircraft functions such as route planning, flight plan modifications, position determination, guidance, vertical navigation, et cetera, which are not the subject of the present disclosure. One skilled in the art will appreciate that the FMS 70 is configured to determine the route 20 of the aircraft 12 based on a flight plan, pilot inputs, et cetera. The route 20 is the path the aircraft 12 is projected to travel along and generally follows along or is calculated with reference to waypoints or airports.

The visual display 80 is configured to display the route 20 and the coverage map 30. In a non-limiting embodiment, the visual display 80 is a Multi-Function Display (MFD). The MFD may be a touch screen display and include soft keys and configurable buttons to display information to a flight crew and allow pilots to enter information and interact with the MFD. The visual display 80 may display additional information beyond the route 20 and the coverage map 30 including speed, altitude, nearby aircraft, radar weather information, et cetera.

The route compliance module 50 is configured to query the navigation system database 60 to identify a compliant region 32 of the coverage map 30 that is compliant with the geodetic reference datum standard based on the compliance information 62. The route compliance module 50 is further configured to identify a non-compliant region 34 of the coverage map 30 that is not compliant with the geodetic reference datum standard based on the compliance information 62. The route compliance module 50 is further configured to adjust the visual display 80 to differentiate a compliant portion 22 of the route 20 and a non-compliant portion 24 of the route 20.

The compliant region 32 of the coverage map 30 is shown as a solid line, while the non-compliant region 34 of the coverage map 30 is shown as a dashed line. Similarly, the compliant portion 22 of the route 20 is shown as a solid line, while the non-compliant 24 portion of the route 20 is shown as a dashed line. In addition to this differentiation, the route compliance module 50 may differentiate the compliant and non-compliant portions on the display 80 by using different colors, sizes, shapes, fonts, or flashing the compliant and non-compliant portions relative to one another.

In this way, the system 10 provides the flight crew of an aircraft 12 with a visual differentiation between the compliant portion 22 of the route 20 and the non-compliant 24 portion of the route 20. Furthermore, the compliant region 32 of the coverage map 30 is differentiated from the non-compliant region 34 of the coverage map 30. This is turn allows the flight crew to identify airports that are not compliant with the GNSS navigation system 40 and take the appropriate action.

The components of the system 10 have been shown as discrete blocks in the representation of FIG. 1 to aid in understanding how the system 10 displays portions of a route on a coverage map that are non-compliant for a GNSS navigation system. However, one skilled in the art will appreciate that the components including the GNSS navigation system 40, the route compliance module 50, the navigation system 68, the FMS 70, and the display 80 may be combined with one another in various forms without departing from the spirit of the present disclosure.

In a non-limiting embodiment of the system 10, the GNSS navigation system 40 is a localizer performance with vertical guidance (LPV) GNSS navigation system. An LPV GNSS navigation system is a high precision Global Positioning System (GPS) aviation instrument approach procedure that uses geodetic reference data to provide precision lateral and vertical guidance to an aircraft 12 approaching and landing on a runway.

In a non-limiting embodiment, the route compliance module 50 is configured to disable the LPV approach when the aircraft 12 is in the non-compliant region 34. In a non-limiting embodiment, the route compliance module 50 is configured to disable the LPV approach when the aircraft 12 is traveling on the non-compliant portion 24 of the route 20. In a non-limiting embodiment, the route compliance module 50 is configured to disable the LPV approach when a non-compliant airport is selected as a destination airport of the route 20. In this way, the system 10 disables LPV approach when the geodetic reference datum standard necessary for an effective LPV approach is unavailable.

In a non-limiting embodiment, the route compliance module 50 is configured to display that an LPV approach is not available for a non-compliant airport. In a non-limiting embodiment, the route compliance module 50 is configured to display on an airport information screen that a selected airport is a non-compliant airport. As detailed above, the route compliance module 50 identifies compliant regions 32 and non-compliant regions 34 based on the geodetic reference datum standard from the GNSS navigation system 40 and the compliance information 62 from the navigation system database 60 corresponding to the plurality of airports 64, 65, 66. Accordingly, the route compliance module 50 identifies airports that are compliant and non-compliant and displays this information to the flight crew on the display 80.

In a non-limiting embodiment, the route compliance module 50 is configured to adjust the visual display 80 to differentiate between a compliant airport 36 and a non-compliant airport 38. The compliant airport 36 of the coverage map 30 is shown as a solid circle while the non-compliant airport 38 of the coverage map 30 is shown as a hollow circle.

In a non-limiting embodiment, the route compliance module 50 is configured to adjust the visual display 80 to differentiate when the compliant portion 22 of the route 20 or the non-compliant portion 24 of the route 20 is outside a field of view of the coverage map 30. For example, if the coverage map 30 is zoomed in and only a limited portion of the route 20 is displayed on the visual display 80, a non-compliance symbol may be used where the route 20 goes off screen to indicate that the route 20 not shown on the screen is a non-compliant portion 24 of the route 20. Similarly, a compliance symbol may be used where the route 20 goes off screen to indicate that the route 20 not shown on the screen is a compliant portion 22 of the route 20.

In a non-limiting embodiment, the route compliance module 50 is configured to adjust the visual display 80 to differentiate the compliant portion 22 of the route 20 and the non-compliant portion 24 of the route 20 prior to a takeoff of the aircraft 12. As detailed above, pilots generally enter the flight plan into the FMS 70 prior to takeoff. Accordingly, the route 20 is available from the FMS 70 for the route compliance module to use in identifying the compliant portions 22 and the non-compliant portions 24 of the route 20.

In a non-limiting embodiment, the route compliance module 50 is configured to display the compliant portion 22 of the route 22 and the non-compliant portion 24 of the route 20 during a planning phase of the route 20. Displaying this information to the pilot prior to takeoff will provide the pilot with the information to adjust the route 20 as necessary to avoid or minimize non-compliant portions 24 of the route 20.

It should be understood that FIG. 1 is a simplified representation of a system 10 for purposes of explanation and ease of description, and FIG. 1 is not intended to limit the application or scope of the subject matter in any way. In practice, the system 10 and/or aircraft 12 will include numerous other devices and components for providing additional functions and features, as will be appreciated in the art.

Figure 2:
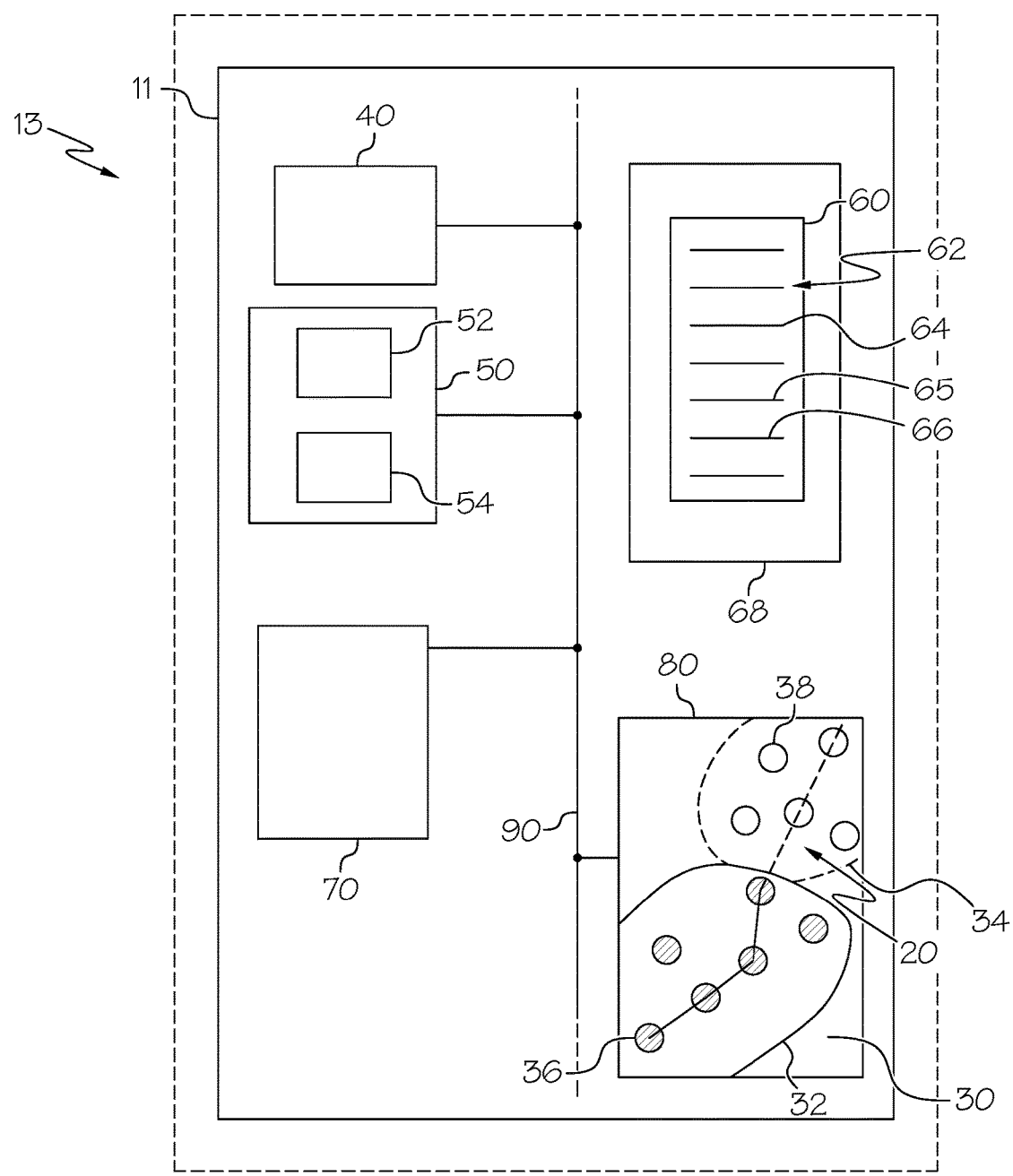
FIG. 2 is a block diagram of an exemplary system for displaying portions of a route on a coverage map that are non-compliant for a GNSS navigation system in an aircraft.

With reference now to FIG. 2, a system 11 for displaying regions on a coverage map 30 that are non-compliant 34 for a GNSS navigation system 40 in an aircraft is shown herein. As system 11 includes many of the same components from system 10 from FIG. 1, the same reference numbers will be used and referenced when appropriate. Accordingly, the discussion of system 11 will relate to the features that differ relative in system 10. The system 11 is generally implemented in an aircraft 13. The aircraft 13 from system 11 includes the GNSS navigation system 40, the route compliance module 50, the navigation system database 60, the FMS 70, the display 80, and the communications bus 90.

In contrast to the system 10, the route compliance module 50 from the system 11 is configured to adjust the visual display to differentiate the compliant region 32 and the non-compliant region 34 on the coverage map. Stated differently, while the route compliance module 50 is configured to identify a compliant region 32 of the coverage map 30 that is compliant with the geodetic reference datum standard and identify a non-compliant region 34 of the coverage map 30 that is not compliant with the geodetic reference datum standard based on the compliance information 62 and the route 20, the display of the route 20 does not change.

In a non-limiting embodiment, the route compliance module 50 is configured to disable the LPV approach when the aircraft 13 is in the non-compliant region 34. In a non-limiting embodiment, the route compliance module 50 is configured to disable the LPV approach when a non-compliant airport is selected as a destination airport.

Figure 3:
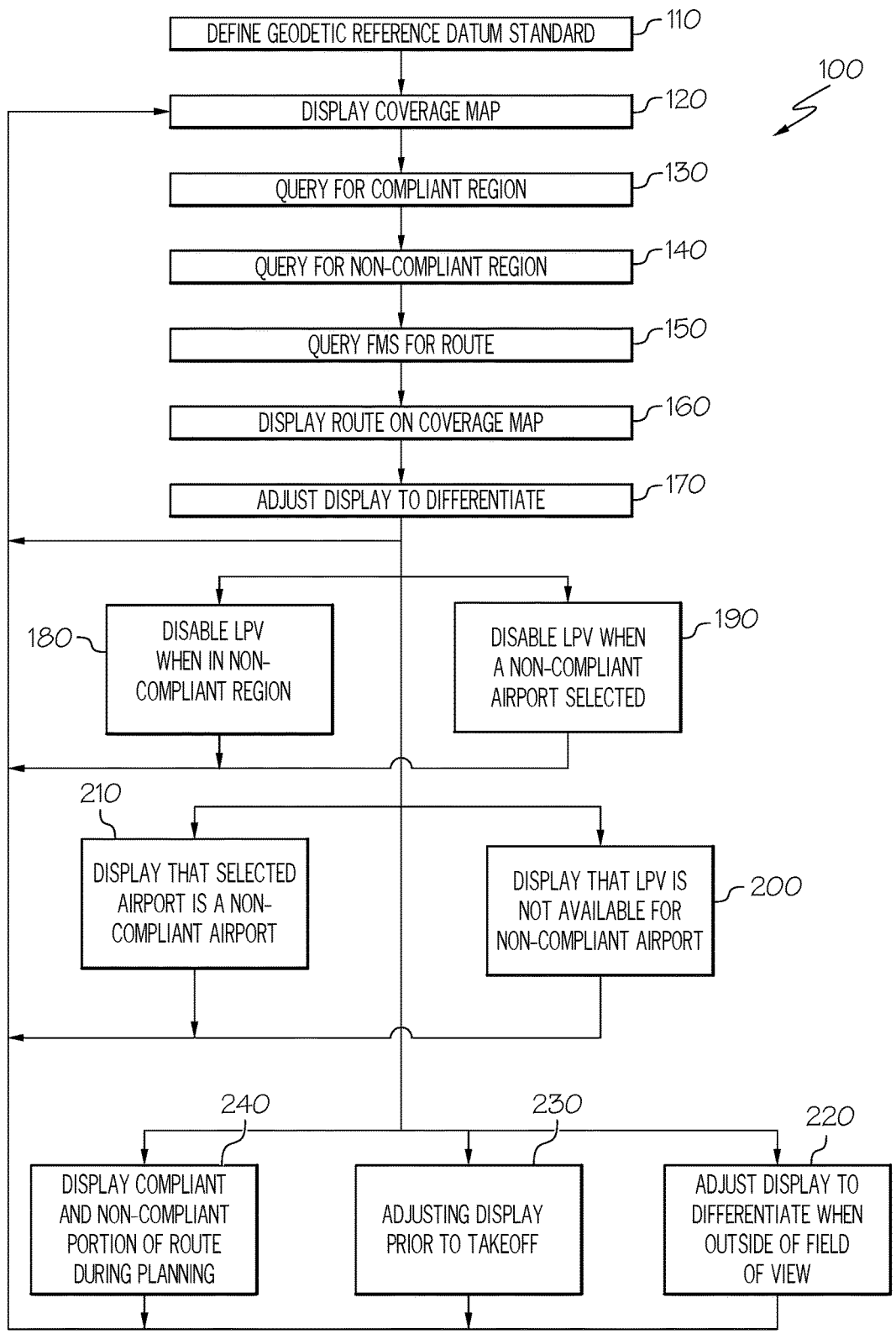
FIG. 3 a flow diagram of an exemplary method suitable for use with the systems of FIGS. 1 and 2 in accordance with the exemplary embodiments.

Referring now to FIG. 3, and with continued reference to FIGS. 1-2, a flowchart illustrates a method 100 performed by the systems 10, 11 of FIGS. 1-2 in accordance with the present disclosure. As can be appreciated in light of the disclosure, the order of operation within the method 100 is not limited to the sequential execution as illustrated in FIG. 3, but may be performed in one or more varying orders as applicable and in accordance with the requirements of a given application.

In various exemplary embodiments, the systems 10, 11 method 100 are operated based on predetermined events, such as attempting to start up the aircraft 12, 13. Method 100 may be performed by the systems 10, 11 or may be performed by any other suitable device or system configured in a manner consistent with the teachings of the present disclosure. Unless otherwise noted, the method 100 may be performed by any of the embodiments of the systems 10, 11 previously described above.

The method 100 starts at block 110 defining a geodetic reference datum standard based on the GNSS navigation system. In a non-limiting embodiment, the route compliance module 50 defines the geodetic reference datum standard based on the GNSS navigation system 40. At block 120, the method 100 displays the coverage map on a visual display. In a non-limiting embodiment, the visual display 80 displays the coverage map 30.

At block 130, the method 100 queries a navigation system database to identify a compliant region of the coverage map that is compliant with the geodetic reference datum standard. In a non-limiting embodiment, the route compliance module 50 queries the navigation system database 60 to identify the compliant region 32 of the coverage map 30 that is compliant with the geodetic reference datum standard. At block 140, the method 100 queries the navigation system database to identify a non-compliant region of the coverage map that is not compliant with the geodetic reference datum standard. In a non-limiting embodiment, the route compliance module 50 queries the navigation system database 60 to identify the non-compliant region 34 of the coverage map 30 that is not compliant with the geodetic reference datum standard.

At block 150, the method 100 queries a flight management system for a route of the aircraft. In a non-limiting embodiment, the route compliance module 50 queries the FMS 70 for the route 20 of the aircraft 12, 13. At block 160, the method 100 displays the route on the coverage map. In a non-limiting embodiment, the visual display 80 displays the route 20 on the coverage map 30. At block 170, the method 100 adjusts the visual display to differentiate a compliant portion of the route and a non-compliant portion of the route. In a non-limiting embodiment, the route compliance module 50 adjusts the visual display 80 to differentiate a compliant portion 22 of the route 20 and a non-compliant portion 24 of the route 20. From block 170, the method 100 returns to block 120 and displays the coverage map. In this way, the method 100 displays portions of a route on a coverage map that are non-compliant for a GNSS navigation system in an aircraft.

In a non-limiting embodiment, the method 100 further disables an LPV approach (block 180) when the aircraft is in the non-compliant region. In a non-limiting embodiment, the route compliance module 50 disables the LPV approach when the aircraft 12, 13, is in the non-compliant region 34.

In a non-limiting embodiment, the method 100 further disables an LPV approach (block 190) when a non-compliant airport is selected as a destination airport. In a non-limiting embodiment, the route compliance module 50 disables the LPV approach when a non-compliant airport is selected as a destination airport.

In a non-limiting embodiment, the method 100 further displays an LPV approach (block 200) that is not available for non-compliant airports. In a non-limiting embodiment, the visual display 80 displays that the LPV approach for the aircraft 12, 13, is not available for non-compliant airports.

In a non-limiting embodiment, the method 100 further displays on an airport information screen (block 210) that a selected airport is a non-compliant airport. In a non-limiting embodiment, the visual display 80 displays on an airport information screen that the selected airport is a non-compliant airport.

In a non-limiting embodiment, the method 100 further adjusts the visual display (block 220) to differentiate when the compliant portion of the route or the non-compliant portion of the route is outside a field of view of the coverage map. In a non-limiting embodiment, the route compliance module 50 adjusts the visual display 80 to differentiate when the compliant portion 22 of the route or the non-compliant portion 24 of the route 20 is outside a field of view of the coverage map 30.

In a non-limiting embodiment, the method 100 further adjusts the visual display (block 230) prior to a takeoff of the aircraft. In a non-limiting embodiment, the route compliance module 50 adjusts the visual display 80 prior to a takeoff of the aircraft 12, 13.

In a non-limiting embodiment, the method 100 further displays (block 24) the compliant portion of the route and the non-compliant portion of the route during a planning phase of the route. In a non-limiting embodiment, the visual display 80 displays the compliant portion 22 of the route 20 and the non-compliant portion 24 of the route 20 during a planning phase of the route 20.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A system for displaying portions of a route on a coverage map that are non-compliant for a Global Navigation Satellite System (GNSS) navigation system in an aircraft, the system comprising:
    a route compliance module configured to define a geodetic reference datum standard based on the GNSS navigation system;
    a navigation system database having compliance information corresponding to each of a plurality of airports;
    a flight management system configured to determine the route of the aircraft; and
    a visual display configured to display the route and the coverage map,
    wherein the route compliance module is further configured to query the navigation system database, identify a non-compliant region of the coverage map that is not compliant with the geodetic reference datum standard based on the compliance information, and adjust the visual display to differentiate a non-compliant portion of the route extending within the non-compliant region of the coverage map.

2. The system of claim 1 wherein the route compliance module is further configured to:
    disable a localizer performance with vertical guidance approach when the aircraft is in the non-compliant region.

3. The system of claim 1 wherein the route compliance module is further configured to:
    disable a localizer performance with vertical guidance approach when a non-compliant airport is selected as a destination airport of the route.

4. The system of claim 1 wherein the route compliance module is further configured to:
    display that a localizer performance with vertical guidance approach is not available for non-compliant airport.

5. The system of claim 1 further comprising an airport information screen, wherein the route compliance module is further configured to display on the airport information screen that a selected airport is a non-compliant airport.

6. The system of claim 1 wherein the route compliance module is further configured to:
    adjust the visual display to differentiate between a compliant airport and a non-compliant airport.

7. The system of claim 1 wherein the route compliance module is further configured to:

adjust the visual display to differentiate when the non-compliant portion of the route is outside a field of view of the coverage map.

8. The system of claim 1 wherein the route compliance module is further configured to:
adjust the visual display prior to a takeoff of the aircraft.

9. The system of claim 1 the route compliance module is further configured to:
display the non-compliant portion of the route during a planning phase of the route.

10. A system for displaying regions on a coverage map that are non-compliant for a Global Navigation Satellite System (GNSS) navigation system in an aircraft, the system comprising:
a route compliance module configured to define a geodetic reference datum standard based on the GNSS navigation system;
a navigation system database having a plurality compliance information corresponding to each of a plurality of airports;
a flight management system configured to determine the route of the aircraft; and
a visual display configured to display the route and the coverage map,
wherein the route compliance module is further configured to query the navigation system database, identify a non-compliant region of the coverage map that is not compliant with the geodetic reference datum standard based on the compliance information and the route, and adjust the visual display to differentiate the non-compliant region on the coverage map.

11. The system of claim 10 wherein the route compliance module is further configured to:
disable a localizer performance with vertical guidance approach when the aircraft is in the non-compliant region.

12. The system of claim 10 wherein the route compliance module is further configured to:
disable a localizer performance with vertical guidance (LPV) approach when a non-compliant airport is selected as a destination airport of the route.

13. A method displaying portions of a route on a coverage map that are non-compliant for a Global Navigation Satellite System (GNSS) navigation system in an aircraft, the method comprising:
defining a geodetic reference datum standard based on the GNSS navigation system;
displaying the coverage map on a visual display;
querying the navigation system database to identify a non-compliant region of the coverage map that is not compliant with the geodetic reference datum standard;
querying a flight management system for a route of the aircraft;
displaying the route on the coverage map; and
adjusting the visual display to differentiate a non-compliant portion of the route extending within the non-compliant region of the coverage map.

14. The method of claim 13, further comprising:
disabling a localizer performance with vertical guidance approach when the aircraft is in the non-compliant region.

15. The method of claim 13, further comprising:
disabling a localizer performance with vertical guidance approach when a non-compliant airport is selected as a destination airport of the route.

16. The method of claim 13, further comprising:
displaying that a localizer performance with vertical guidance approach is not available for non-compliant airports.

17. The method of claim 13, further comprising:
displaying on an airport information screen that a selected airport is a non-compliant airport.

18. The method of claim 13, further comprising:
adjusting the visual display to differentiate when the non-compliant portion of the route is outside a field of view of the coverage map.

19. The method of claim 13, further comprising:
adjusting the visual display prior to a takeoff of the aircraft.

20. The method of claim 13, further comprising:
displaying the non-compliant portion of the route during a planning phase of the route.

* * * * *